United States Patent

[11] 3,599,008

[72] Inventor Jerzy Gorski-Popiel
Sutton, England
[21] Appl. No. 743,397
[22] Filed July 9, 1968
[45] Patented Aug. 10, 1971
[73] Assignee Associated Electrical Industries Limited
London, England
[32] Priority July 10, 1967, Sept. 22, 1967, Sept. 28, 1967
[33] England
[31] 31,663/67, 43,185/67 and 44,145/67

[54] ELECTRICAL CIRCUITS FOR SIMULATING INDUCTOR NETWORKS
1 Claim, 17 Drawing Figs.

[52] U.S. Cl. 307/200, 307/233, 307/295, 333/80 T
[51] Int. Cl. H01l, 1/24H01p
[50] Field of Search 307/295, 200, 234; 333/80, 80 T; 330/12, 30, 30 D, 107, 109

[56] References Cited

UNITED STATES PATENTS

| | | | |
|---|---|---|---|
| 3,120,645 | 2/1964 | Sipress et al. | 330/12 |
| 3,401,352 | 9/1968 | Mitra | 330/107 X |
| 3,443,236 | 5/1969 | Kahn et al. | 330/12 |

OTHER REFERENCES

Deboo, " Application Of A Gyrator-type Circuit To Realize Ungrounded Inductors," IEEE Transactions On Circuit Theory, Mar. 1967, pp. 101, 102 330– 109

Roddam, " Filternics," Wireless World, Aug. 1962 Pages 370— 374

Riordan, " Simulated Inductors Using Differential Amplifiers," Electronics Letters, Feb. 1967 Vol. 3, No. 2 pp. 50, 51 330– 109

*Primary Examiner*—Roy Lake
*Assistant Examiner*—James B. Mullins
*Attorney*—Larson, Taylor & Hinds

ABSTRACT: An electric circuit, for example an active filter circuit, in which inductors are simulated by means of positive immitance converter circuits terminated by resistors. One positive immittance converter circuit is provided for each external ungrounded node of the inductor network, and the terminating resistors are arranged to have the same topology as the inductor network.

ELECTRICAL CIRCUITS FOR SIMULATING INDUCTOR NETWORKS

This invention relates to electrical circuits.

According to the present invention there is provided an electrical circuit in which an inductor or inductor network having *n* external ungrounded input nodes is simulated by *n* positive immittance converter circuits terminated by a resistor or resistor network possessing the same topology in the circuit as the inductor or inductor network, as the case may be.

It is contemplated that the invention will have a particular application in the realization of active filter circuits to provide effective inductances without having to use inductors, so that such filter circuits can be realized as RC active filter circuits which can be constructed as integrated circuits.

In considering the nature of the invention in detail, reference will now be made by way of example to the accompanying drawings of which:

Figure 1:
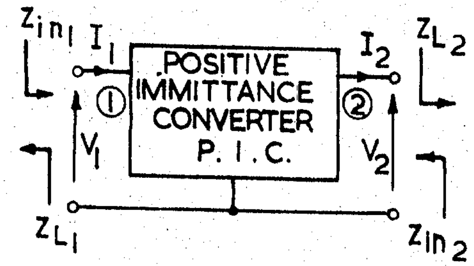
FIG. 1 is a schematic diagram of a positive immittance converter.

Since the active device in the synthesis method proposed by the present invention for active filter circuit realization is a positive immittance converter (P.I.C.) such device will be considered first. A P.I.C. is a two-port network and, as the name implies, it is capable of converting a given impedance (or admittance) into some other convenient impedance (or admittance). The action of the device is illustrated in FIG. 1. If the network is terminated at port 2 in the impedance $Z_{L2}$, the input impedance at port 1 denoted by $Z_{inl}$ is $$Z_{in1}=kZ_{L2} \qquad (1)$$

where the multiplier *k* is usually a ratio of impedances or the ratio of products of impedances, e.g. $Z_1Z_2/Z_3Z_4$ (see FIGS. 2 to 6). It will be appreciated that if any of these impedances are frequency dependent it is, strictly speaking, no longer meaningful to describe *k* as being positive, or negative for that matter. The device is nevertheless described as a positive immittance converter with $k=Z_1Z_2/Z_3Z_4$ merely to distinguish it from a negative immittance converter (N.I.C.) where an analogous factor would be defined $k={}^1Z_1Z_2/Z_3Z_4$. In the former case, if all of the impedances $Z_1$ to $Z_4$ are positive resistor *k* is a positive constant, whereas in the latter case *k* is a negative constant. If an impedance $Z_{L1}$ terminates port 1 in FIG. 1, the input impedance $Z_{in2}$ at port 2 is found to be $$Z_{in2}=\frac{1}{k}Z_{L1} \qquad (2)$$

Thus, it will be noted that as far as its impedance properties are concerned, the network is a generalization of a transformer.

Consider next the voltages and currents on the two ports of the P.I.C. With the current convention adopted in FIG. 1 the transmission matrix $[T]$ is defined by $$\begin{bmatrix}V_1\\I_1\end{bmatrix}=\begin{bmatrix}AB\\CD\end{bmatrix}\begin{bmatrix}V_2\\I_2\end{bmatrix}$$

where for convenience $$[T]=\begin{bmatrix}AB\\CD\end{bmatrix}$$

Also $$Z_{in1}=\frac{V_1}{I_1}=\frac{AV_2+BI_2}{CV_2+DI_2}=\frac{AZL_2+B}{CZL_2+D}$$

if $Z_{in1}=kZL_2, B=C=0$ then $Z_{in1}=(a/D)\ ZL_2$ i.e. *k*32 *A*/*D*. So if the device is to be a converter it follows that the parameter *B* and *C* of its transmission matrix must be zero. If, with this current convention, equation 1 is to hold, the following three cases may occur;

$$\text{Case (1)}\quad V_1=kV_2,\quad I_1=I_2 \qquad (3)$$

$$\text{Case (2)}\quad V_1=V_2,\quad I_1=\frac{1}{k}I_2 \qquad (4)$$

$$\text{Case (3)}\quad V_1=k_1V_1,\quad I_1=k_2I_2 \qquad (5)$$

where $$k=\frac{k_1}{k_2}$$

The transmission matrices for the above three cases will therefore be $$\text{Case (1)}\ [T]_1=\begin{bmatrix}k & 0\\0 & 1\end{bmatrix} \qquad (6)$$

$$\text{Case (2)}\ [T]_2=\begin{bmatrix}1 & 0\\0 & \frac{1}{k}\end{bmatrix} \qquad (7)$$

$$\text{Case (3)}\ [T]_3=\begin{bmatrix}k_1 & 0\\0 & k_2\end{bmatrix} \qquad (8)$$

FIGS. 2 to 8 show respective circuits of P.I.C. realization using transistors as active devices. The operation of each of these circuits may best be described by assuming each transistor therein to be ideal, that is, a transistor in which emitter and collector currents are equal, with no base current present, and in which the emitter and base voltages are equal, with the collector voltage being undefined with respect to the emitter and base voltages.

Figure 2:
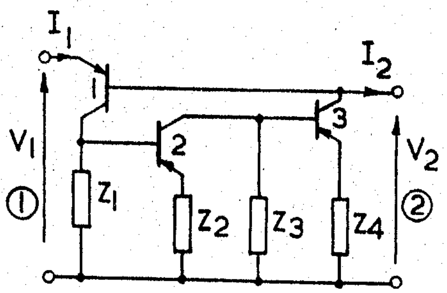

In the circuit of FIG. 2, the voltage $V_2$ is applied to the base of transistor 1 and hence appears on the emitter of this transistor. Therefore $V_1=V_2$. Current $I_1$ flows through transistor 1 and through impedance $Z_1$ to ground. This produces a voltage $I_1Z_1$ which is applied to the base of transistor 2 and hence also appear on the emitter of this transistor, i.e. across impedance $Z_2$. A current $I_1\ (Z_1/Z_2)$ will therefore flow to ground through impedance $Z_2$. This current will flow in the collector of transistor 2 and will therefore flow from the ground up through impedance $Z_3$. A negative voltage equal to $I_1\ (Z_1/Z_2)\ Z_3$ will therefore appear across impedance $Z_3$. This is applied to the base of transistor 3 and hence across impedance $Z_4$, and a current will flow up from ground through impedance $Z_4$. Its magnitude will be $I_1\ (Z)_1Z_3/Z_2(Z_4)$ and will be equal to current $I_2$. Thus $V_1=V_2$ and $I_1=(Z_2\ Z_4/Z_1Z_3)\ I_2$, which two equations define the following transmission matrix *T* for this circuit.

$$[T]=\begin{bmatrix}1 & 0\\0 & \frac{Z_2Z_4}{Z_1Z_3}\end{bmatrix}$$

Figure 3:
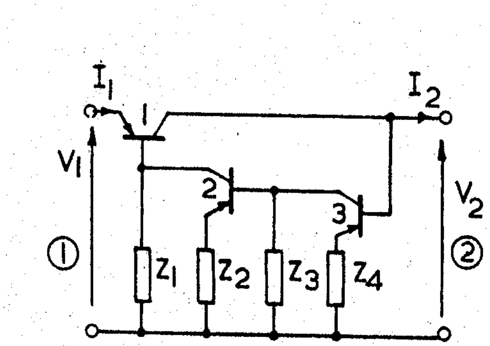

In the circuit of FIG. 3, the current into the emitter of transistor 1 flows out at its collector and since there is no current in the base of transistor 3, $I_2=I_1$. Voltage $V_2$ appears across impedance $Z_4$ producing a current $V_2=1/Z_4$: this current flows in the negative direction (i.e. from ground up) through impedance $Z_3$: hence a voltage $-V_2\ (Z_3/Z_4)$ is applied to the base of transistor 2. This appears across impedance $Z_2$ and results in a current $-V_2\ (Z_3/Z_2Z_4)$. This flows again in a negative direction through impedance $Z_1$. The two negative signs cancel and the voltage across impedance $Z_1=V_2\ (Z_1Z_31Z_2Z_4)$ is applied to the base of transistor 1 and hence is equal to voltage $V_1$. In this instance the transmission matrix $[T]$ is $$[T]=\begin{bmatrix}\frac{Z_1Z_3}{Z_2Z_4} & 0\\0 & 1\end{bmatrix}$$

Figure 4:
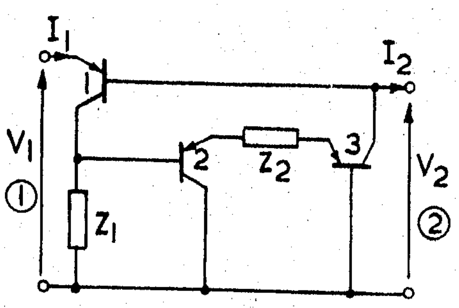
FIGS. 2 to 8 are respective positive immittance converter circuits employing transistors as active devices.

In the circuit of FIG. 4, current $I_1$ flows through transistor 1 and into impedance $Z_1$ to ground. The voltage $I_1Z_1$ is applied to the base of transistor 2. Since the base of transistor 3 is at ground potential so is the emitter of transistor 3. Hence the voltage $I_1Z_1$ is applied across impedance $Z_2$ so a current $I_1$ ($Z_1/Z_2$) flows through transistor 3. This is equal to current $I_2$. $V_2=V_1$ through the action of transistor 1. The transmission matrix [$T$] for this circuit is $$[T]=\begin{bmatrix}1 & 0\\ 0 & \frac{Z_2}{Z_1}\end{bmatrix}$$

Figure 5:
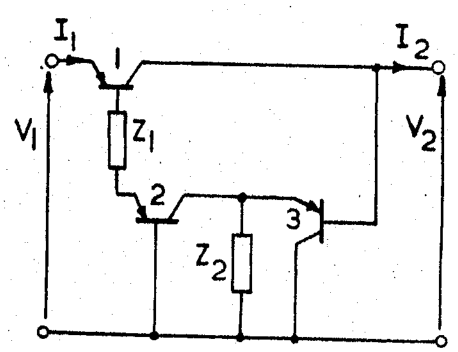

In the circuit of FIG. 5, current $I_1$ just as in the circuit of FIG. 3, is equal to $I_2$. Voltage $V_2$ appears across impedance $Z_2$ and draws a current $V_2/Z_2$ through transistor 2: this current flows through impedance $Z_1$ and hence establishes a voltage $V_2$ ($Z_1/Z_2$). Because of transistor 2, this voltage is applied between ground and the base of transistor 1. Hence it is equal to voltage $V_1$. It should be noted that in this circuit some current flow has to be admitted in the base of transistor 1. The transmission matrix [$T$] for this circuit is $$[T]=\begin{bmatrix}\frac{Z_1}{Z_2} & 0\\ 0 & 1\end{bmatrix}$$

Figure 6:
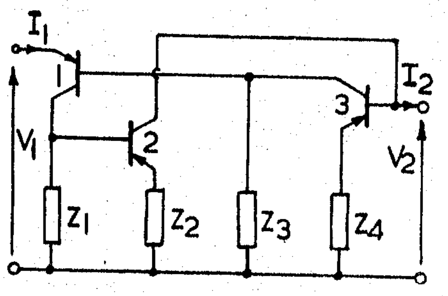

In the circuit of FIG. 6, current $I_1$ flows through impedance $Z_1$ to ground, producing a voltage $I_1Z_1$ which is applied across impedance $Z_2$. Hence $I_2=-I_1$ ($Z_1/Z_2$. Voltage $V_2$ appears across impedance $Z_4$ and hence a current $V_2/Z_4$ flow in a negative direction through impedance $Z_3$ producing a voltage $-V_2$ ($Z_3/Z_4$. This is equal to voltage $V_1$. The transmission matrix [$T$] for this circuit is $$[T]=\begin{bmatrix}-\frac{Z_3}{Z_4} & 0\\ 0 & -\frac{Z_2}{Z_1}\end{bmatrix}$$

Figure 7:
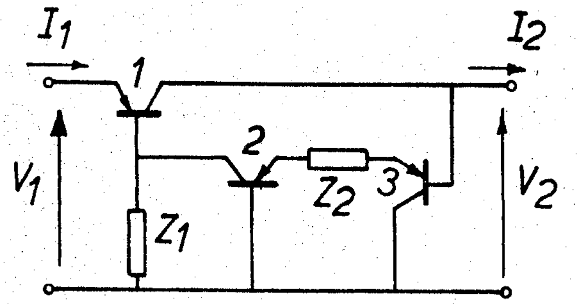

In the circuit of FIG. 7 the current $I_1$ flows through transistor 1 and since no current flows in the base of transistor 3, $I_1=I_2$. The voltage $V_2$ is, by virtue of the action of transistors 3 and 2, applied across impedance $Z_2$ making a current $V_2/Z_2$ flow through transistor 2 and down to ground through impedance $Z_1$. The voltage across impedance $Z_1$ is therefore equal to $V_2\times(Z_1/Z_2)$. This, by virtue of transistor 1, is equal to $V_1$, hence $V_1=(Z_1/Z_2)\times V_2$ and $I_1=I_2$. These equations define the following transmission matrix for this circuit.

$$[T]=\begin{bmatrix}\frac{Z_1}{Z_2} & 0\\ 0 & 1\end{bmatrix}$$

Figure 8:
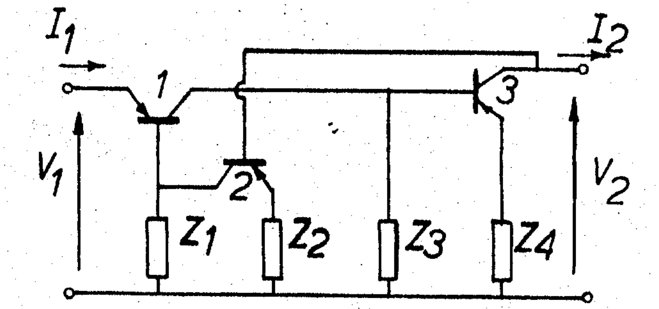

In the circuit of FIG. 8, the current $I_1$ flows through transistor 1 and to ground through impedance $Z_3$. This establishes a voltage $I_1Z_3$ which is applied to the base of transistor 3 and consequently across impedance $Z_4$. A current $I_1(Z_3/Z_4)$ will flow therefore to ground through impedance $Z_4$. This must be equal to $-I_2$. Voltage $V_2$ is applied to the base of transistor 2 a hence across impedance $Z_2$. Therefore, a current $V_2/Z_2$ is drawn in a negative direction (i.e. from ground upwards) through impedance $Z_1$, causing a voltage $-V_2$ ($Z_1/Z_2$) to be established across impedance $Z_1$. This voltage, by virtue of transistor 1, is equal to $V_1$. Hence $V_1=-(Z_1/Z_2)$ $V_2$ and $I_1=-(Z_4/Z_3)$ $I_2$. These equations define the following transmission matrix for this circuit.

$$[T]=\begin{bmatrix}\frac{Z_1}{Z_2} & 0\\ 0 & -\frac{Z_4}{Z_3}\end{bmatrix}$$

For synthesis applications of the circuits of FIGS. 2 to 8 in accordance with the invention, impedance $Z_2$ or $Z_4$ would be capacitive with the remaining impedances resistive in each of the circuits of FIGS. 2, 3, 6 and 8, while in the circuit of FIGS. 4, 5 and 7 impedance $Z_2$ would be capacitive and impedance $Z_1$ resistive.

The P.I.C circuit of FIG. 9 employs two differential amplifiers $A_1$ and $A_2$ which, in the following description of the operation of the circuit, will be assumed to be ideal with infinite gain. On this assumption the input voltages $V_1$ and $V_2$ to the amplifiers will be zero. Therefore $V_1=V_2$. Since the input impedance into the amplifiers is infinitely large all of current $I_1$ will flow through impedance $Z_a$. Hence the voltage between node 3 and ground is $V_1-I_1Z_a$. Since voltage $v_2$ is zero, the voltage between node 4 and ground is equal to $V_1=V_2$. Hence the voltage drop between node 3 and 4 is $V_1-I_1Z_a-V_1=I_1Z_a$. The current flowing from node 3 to 4 is therefore $-I_1Z_aY_b$; ($Y_b=I/Zb$). All of this current will flow through impedance $Z_c$, so the voltage between node 5 and ground $V_2-(-I_1Z_aY_bZ_c)=V_2+I_1Z_aY_bZ_c$. Hence the voltage drop between nodes 5 and 2 is $V_2+I_1Z_aY_bZ_c-V_2=I_1Z_aY_bZ_c$ and the current flowing from node 5 to node 2 is therefore $I_1Z_aY_bZ_cY_d$; ($Y_d=1/Zd$). But this current is equal to $I_2$ hence $$I_2=\frac{Z_aZ_c}{Z_bZ_d}I_1$$

Figure 9:
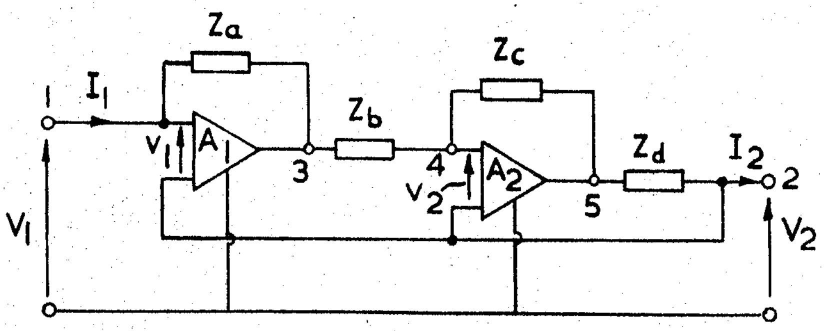
FIG. 9 is a positive immittance converter circuit employing differential amplifiers as active devices.

Therefore the transmission matrix for FIG. 9 will be found to be $$[T]=\begin{bmatrix}1 & 0\\ 0 & \frac{Z_bZ_d}{Z_aZ_c}\end{bmatrix} \qquad (9)$$

This will be recognized to be in the form of case (2), equation (7), considered earlier. Also, all three cases, equations (6) to (8) considered earlier are included in the transmission matrices of FIGS. 2 to 8.

A large number of further realizations of a positive immittance converter circuit is also possible because of a unique property of such circuits. Although this property, which will now be described in some detail, is mathematical in nature, its consequences have some very practical implications. For a P.I.C., $k$ is either a positive constant or a rational function in the complex frequency variable $P$ with all coefficients positive. For a negative immittance converter, or N.I.C., $k$ is either a negative constant or a rational function in $P$ with positive coefficients, premultiplied by $-1$.

A positive (or negative) immittance inverter P.I.I. (N.I.I.) is a two-port network whose input impedance $Z_{in}$ at any one port is related to the load impedance $Z_L$ at the other port by $$Z_{in}=k/Z_L \qquad (10)$$

$k$ is again either frequency independent (positive for a P.I.I., and negative for a N.I.I.) or a rational function in $P$ with all positive coefficients, premultiplied by $+1$ for a P.I.I. and by $-1$ for a N.I.I.

All four networks (P.I.C., N.I.C., P.I.I. and N.I.I.) defined above form a group called "Transverters," and the further realizations of positive immittance converters are formed by connecting any two like transverters, as defined above, in cascade.

The transmission matrices for a P.I.C. and a N.I.C. are of the form:

$$[T]_{\text{con}}=\begin{bmatrix}k_1 & 0\\ 0 & k_2\end{bmatrix} \qquad (11)$$

while those for a P.I.I. or a N.I.I. are of the form:

$$[T]_{\text{inv}}=\begin{bmatrix}0 & k_3\\ k_4 & 0\end{bmatrix} \qquad (12)$$

The ratios $k_1/k_2$ and $k_3/k_4$ must have the same properties as the respective values of $k$ defined above.

Figure 10:
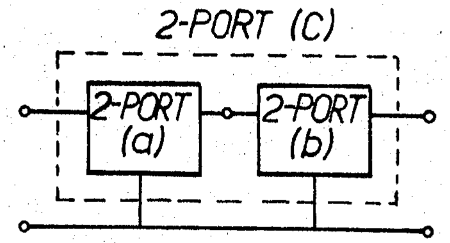
FIG. 10 shows two two-port networks connected in cascade.

The transmission matrix of a composite network formed by connecting any two -port networks in cascade (as shown in FIG. 10) is equal to the product of the transmission matrices of the individual two-port networks.

The product of two converter matrices as given in (11) above will be:

$$\begin{bmatrix} k_{1a} & 0 \\ 0 & k_{2a} \end{bmatrix} \times \begin{bmatrix} k_{1b} & 0 \\ 0 & k_{2b} \end{bmatrix} = \begin{bmatrix} k_{1a}k_{1b} & 0 \\ 0 & k_{2a}k_{2b} \end{bmatrix} \quad (13)$$

The product of two inverter matrices a given in (12) above will be:

$$\begin{bmatrix} 0 & k_{3a} \\ k_{4a} & 0 \end{bmatrix} \times \begin{bmatrix} 0 & k_{3b} \\ k_{4b} & 0 \end{bmatrix} = \begin{bmatrix} k_{3a}k_{4b} & 0 \\ 0 & k_{3b}k_{4a} \end{bmatrix} \quad (14)$$

It will be noted from (13) and (14) that the resultant matrices in both cases assume the same form as the transmission matrix given in (11) above.

If it is assumed for the moment that all $k_i$ in (11) and (12) are real, then for positive transverters it will be found that the two $k$'s appearing in each matrix will be of like sign for negative transverters of opposite sign. Therefore, if the matrices of two transverters of the same kind are multiplied the sign in the resultant nonzero matrix entries will be of the same kind. If the $k_i$ are rational functions premultiplied by +1 or −1, respectively, as the case may be, it will again be found that the resultant matrix will be that of a P.I.C. Continuing in this fashion it will be found that any combination of two like transverter will always result in a network having the transmission matrix of a P.I.C.

Figure 11:
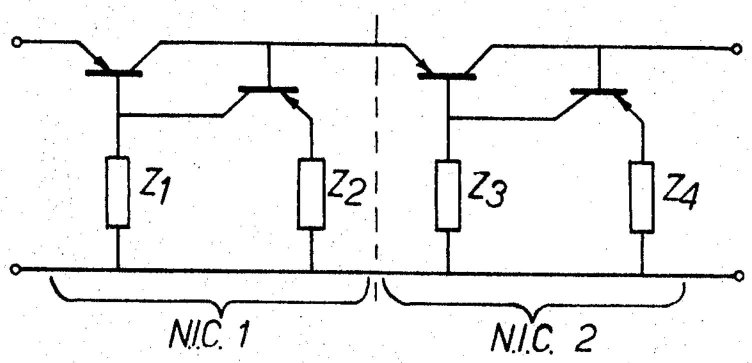
FIG. 11 shows a positive immittance converter formed from two negative immittance converters.

The practical implications of this result are of some importance in the construction of P.I.C.'s. A large group of these networks may be constructed by merely taking two existing designs of some convenient transverter and physically connecting the two together. For example two N.I.C.'s joined together as shown in FIG. 11 give a four-transistor realization of a P.I.C. In this example, two voltage-inverting N.I.C.'s were chosen. This need not be so, a voltage inverting and a current inverting N.I.C. joined together in cascade will give a P.I.C. as well. Also, the order of connection is immaterial. All that is required is that the two networks to be cascaded are N.I.C. networks, what kind of N.I.C. does not matter. This also holds for all other transverters of like type.

It follows from the above that two P.E.C.'s connected in cascade give a further P.I.C. This is of course of theoretical interest and has no practical significance.

Figure 12:
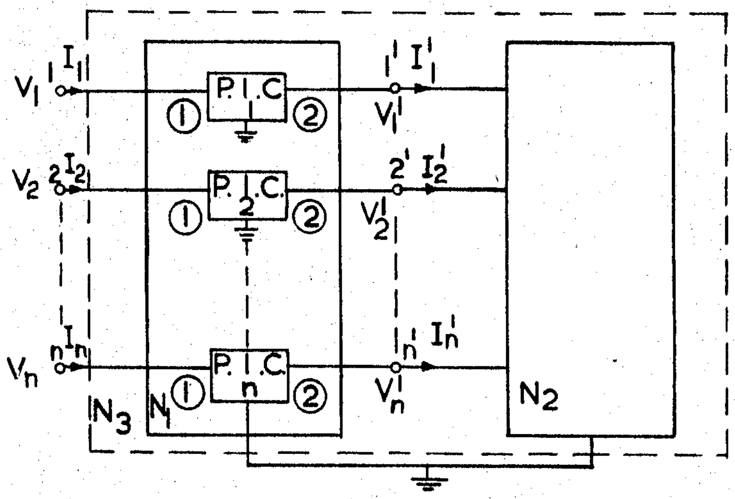
FIG. 12 is illustrative of the theory on which the invention is based.

For the purposes of the present invention it is immaterial what kind of P.I.C. is used, but the synthesis is made much easier if it is assumed that all P.I.C.'s employed are of the same kind. Now, let it be assumed then that the P.I.C. circuit of FIG. 9 is available, and that the network $N$P.I.C.$_1$ of FIG. 12 is formed simply of $n$ separate P.I.C. circuits of this form. Terminals labeled 1 to $n$ are the input nodes of the $n$ P.I.C. circuits and terminals 1′ to $n'$ are the output nodes of the $n$ P.I.C. circuits. Let the ratio $Z_bZ_d/Z_aZ_c$ of each P.I.C. circuit be equal to $1/k$ then, since in each case the voltages on the two ports of each P.I.C. are equal $$V_i = V_i' \text{ and } I_i = \frac{1}{k} I_i' \quad (15)$$

that is, this is merely a number of P.I.C. circuits of the type described in case 2 above.

It is more convenient for the argument to follow, to rewrite equation (15) in vector form:

$$\begin{bmatrix} V_1 \\ V_2 \\ \cdot \\ \cdot \\ V_n \end{bmatrix} = \begin{bmatrix} V_1' \\ V_2' \\ \cdot \\ \cdot \\ V_n' \end{bmatrix} \quad (16)$$

and $$\begin{bmatrix} I_1 \\ I_2 \\ \cdot \\ \cdot \\ I_n \end{bmatrix} = \frac{1}{k} \begin{bmatrix} I_1' \\ I_2' \\ \cdot \\ \cdot \\ I_n' \end{bmatrix} \quad (17)$$

Consider next the entire network $N_3$ of FIG. 12, that is, the network enclosed by dotted lines. Its externally available terminals are the $n$ P.I.C. circuits input nodes. Let the admittance matrix of this network be denoted by $Y$ then $$\begin{bmatrix} I_1 \\ I_2 \\ \cdot \\ \cdot \\ I_n \end{bmatrix} = [Y] \begin{bmatrix} V_1 \\ V_2 \\ \cdot \\ \cdot \\ V_n \end{bmatrix} \quad (18)$$

Let the admittance matrix of network $N_2$ in FIG. 12 be denoted by $Y'$. Both $Y$ and $Y'$ are then $n \times n$ admittance matrices, also $$\begin{bmatrix} I_1' \\ I_2' \\ \cdot \\ \cdot \\ I_n' \end{bmatrix} = [Y'] \begin{bmatrix} V_1' \\ V_2' \\ \cdot \\ \cdot \\ V_n' \end{bmatrix} \quad (19)$$

Using Equations (16), (17) and (19)

$$\begin{bmatrix} I_1 \\ I_2 \\ \cdot \\ \cdot \\ I_n \end{bmatrix} = \frac{1}{k} \begin{bmatrix} I_1' \\ I_2 \\ \cdot \\ \cdot \\ I_2' \end{bmatrix} = \frac{1}{k}[Y'] \begin{bmatrix} V_1' \\ V_2' \\ \cdot \\ \cdot \\ V_n' \end{bmatrix} = \frac{1}{k}[Y'] \begin{bmatrix} V_1 \\ V_2 \\ \cdot \\ \cdot \\ V_n \end{bmatrix} \quad (20)$$

Comparing equations (18) and (20) it follows that $$[Y] = (1/k)[Y'] \quad (21)$$

Figure 13:
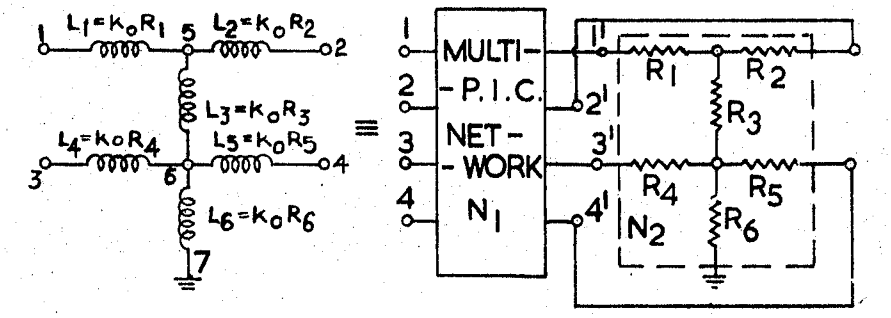
FIGS. 13 and 14 illustrate two examples of putting the invention into effect.

Equation (21) forms the basis of the proposed synthesis method. It will be noted that if $N_2$ is a network containing an arbitrary number and layout of resistors and if $k = k_o p$ (where $k_o$ is an arbitrary positive constant and $p = \sigma + jw$, the complex frequency variable) then $(Y)$ is the matrix of a network containing only inductors. Furthermore the number of inductors and their layout is identical to those of the resistance network. There is a one-to-one correspondence between the resistors and the simulated inductors. The magnitudes of the simulated inductors are determined solely by their corresponding resistor and the transformation factor $k_o$. This is illustrated in FIG. 13. This example illustrates one important point namely the number of P.I.C. circuits necessary to simulate a given inductor network. It will be noted that the multi-P.I.C. circuit network must have as many input nodes (and hence output nodes) as there are external ungrounded input nodes (these will be referred to as externally accessible nodes) on the inductor network. In FIG. 13 nodes 1—4 are the externally accessible nodes, nodes 5 and 6 are internal nodes, and node 7 is grounded. An inspection of FIG. 12 will show that the number of P.I.C. circuits required is equal to the number of input nodes of the multi-P.I.C. circuit network $N_1$.

It should be noted that in the present context an inductor with neither of its two nodes grounded (i.e. a floating inductor) has to be considered as a network with two externally accessible nodes and will therefore require two P.I.C. circuits for its realization.

The synthesis procedure in accordance with the invention may then be carried out as follows:

1. From published tables or by any other convenient method realize the network in LC form.
2. Extract all inductors to form a multinode "inductor only" network.

3. Decide on a convenient inductor-resistor transformation factor $k_o$.
4. Form a multi-P.I.C. circuit network of the type shown in FIG. 12 (network $N_1$), having as many identical P.I.C. circuits with transformation factor $k_o$ as there are ungrounded externally accessible nodes in the "inductor only" network.
5. Replace the "inductor only" network by the multi-P.I.C. circuit network terminated in a resistance network whose layout and number of components is identical to the "inductor only" network and where the resistors are given by $$R_i=(1/k_0)\,L_i.$$

Figure 14:
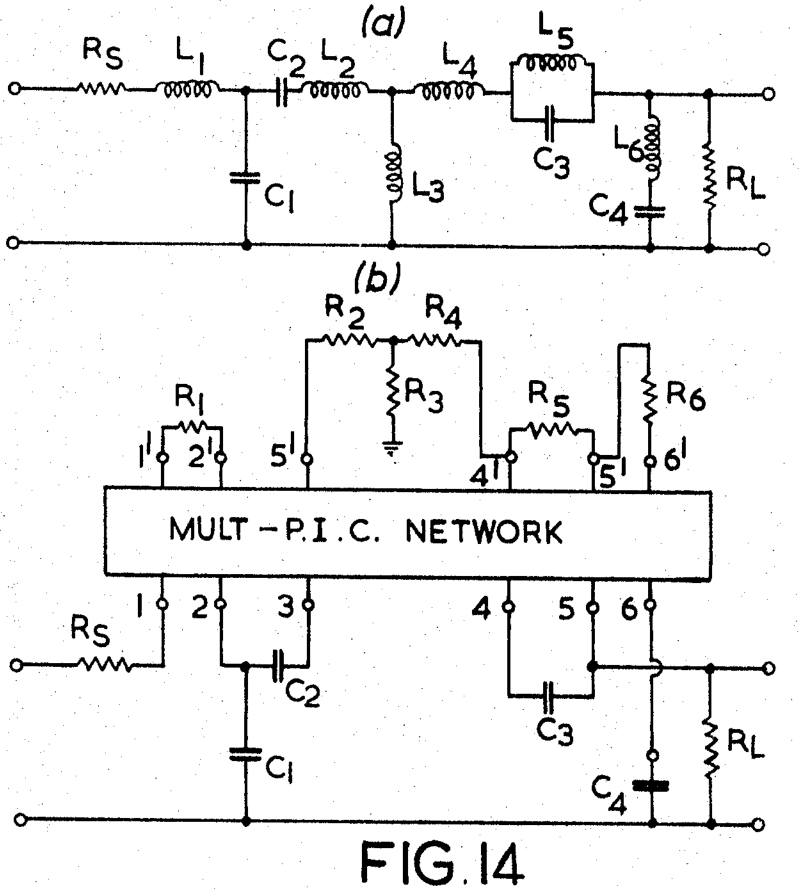

The above procedure is illustrated in the example given in FIG. 14. The hypothetical network (*a*) in FIG. 14 is equivalent to the network (*b*) provided the transformation factor for each of the P.I.C. circuits in the multi-P.I.C. network is equal to $k_o$ and then $R_i=(1/k_o)\,L_i$. Network (*a*) was chosen to illustrate as many as possible of the likely ways in which an inductor may occur in practical LC filter circuits.

It will be appreciated that it is not always necessary to have all P.I.C. circuits in the multi-P.I.C. network with the same inductor-resistor transformation factor $k_o$. Thus in network (*a*) of FIG. 14 the P.I.C. circuits associated with nodes 1 and 2 need not have the same $k_o$ as the P.I.C. circuits associated with the rest of the nodes.

It is interesting to compare the present invention with a prior proposal for the realization of an "inductor only" two-port by means of two gyrators and one capacitor. By means of this prior proposal a network is obtained which has a structure similar to that of FIG. 12 but where instead of P.I.C. circuits an interconnection of gyrators is used. Assuming again the admittance matrices of networks $N_3$ and $N_2$ to be respectively $Y$ and $Y'$ it is shown according to this prior proposal that $$Y=G[Y']^{-1}G_t \qquad (22)$$

where $G$ and its transpose $G_t$ are matrices depending on the gyration conductances of the gyrators. Equation (22) gives an admittance matrix which is not necessarily always realizable, (general realizability criteria for $n\times n$ admittance matrices for $n\geq 3$ have not yet been found), whereas the present invention using P.I.C. circuits will never suffer from any realizability problems.

There is another rather important difference between the multi-P.I.C. and multigyrator approach. This is best illustrated by the example shown in FIGS. 15 to 17. FIGS. 16 and 17 are equivalent to FIG. 15 if $C_i=(1/k_g)\,L_i$ and $R_i=(1/k_p)\,L_i$ in FIGS. 16 and 17 respectively.

Figure 15:
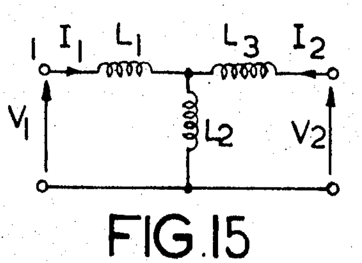
FIGS. 15 to 17 serve for comparison of the present invention with a known means of inductor simulation.
Figure 16:
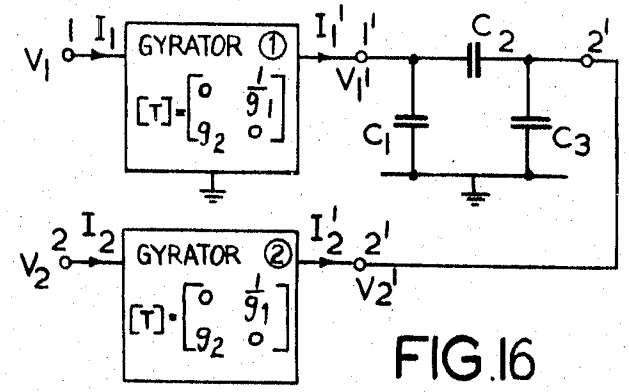
Figure 17:
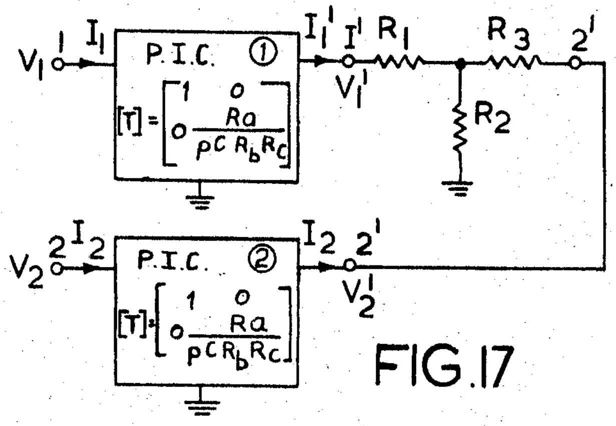

The $Z$-matrix for each of FIGS. 15 to 17 is as follows:

Fig. 15 $$[Z]=p\begin{bmatrix}(L_1+L_2) & L_2\\ L_2 & (L_2+L_3)\end{bmatrix}$$

Fig. 16 $$[Z]=p\underbrace{\frac{1}{g_1g_2}}_{Kg}\begin{bmatrix}(C_1+C_2) & C_2\\ C_2 & (C_2+C_3)\end{bmatrix}$$

Fig. 17 $$[Z]=p\underbrace{C\frac{R_bR_c}{R_a}}_{K_p}\begin{bmatrix}(R_1+R_2) & R_2\\ R_2 & (R_2+R_3)\end{bmatrix}$$

From these $Z$-matrices it will be seen that both the factors $K_g$ and $K_p$ (for the gyrator and P.I.C. realization respectively) can be set to any required value by adjustment of resistor only. However, in the gyrator realization adjustment of the simulated inductors requires adjustment of the corresponding capacitor. In the P.I,C. case the same operation requires a change in the resistors. Consequently if the P.I.C. realization is used any of the tuning or magnitude adjustments in the filter can be carried out on resistors only whereas if gyrators are used some adjustments may have to be carried out on capacitors. With the present state of the art, thin film resistors are much easier to trim to precise specified values than capacitors. Hence the P.I.C. realization is in this respect superior to the gyrator one. It should also be noted that the actual magnitude of the capacitor inside each P.I.C. can (probably in most applications) be set to any convenient magnitude. Hence the spread of the capacitors associated with the inductance simulation part of the network can be reduced to an absolute minimum. The same is not the case in the gyrator realization.

I claim:

1. An electrical circuit for simulating an inductor network having *n* external ungrounded nodes comprising *n* positive immittance converter circuits, *n* being a positive integer greater than two, each said circuit having first and second ports, a resistor network of the same topology as the inductor network and also having *n* external ungrounded nodes, means for connecting each of said nodes of the resistor network to the first port of a respective converter circuit, and means for making external connections to the second ports of the respective converter circuits.